United States Patent
Luc et al.

(10) Patent No.: US 9,557,577 B2
(45) Date of Patent: Jan. 31, 2017

(54) METHOD OF PREPARING AN OPHTHALMIC LENS

(71) Applicants: Martin Luc, Charenton le Pont (FR); Benoit Holvoet Vermaut, Charenton le Pont (FR); Frederic Dubois, Charenton le Pont (FR)

(72) Inventors: Martin Luc, Charenton le Pont (FR); Benoit Holvoet Vermaut, Charenton le Pont (FR); Frederic Dubois, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 289 days.

(21) Appl. No.: 14/359,688

(22) PCT Filed: Nov. 16, 2012

(86) PCT No.: PCT/FR2012/000465
§ 371 (c)(1),
(2) Date: May 21, 2014

(87) PCT Pub. No.: WO2013/079821
PCT Pub. Date: Jun. 6, 2013

(65) Prior Publication Data
US 2014/0340633 A1    Nov. 20, 2014

(30) Foreign Application Priority Data
Nov. 30, 2011 (FR) .................... 11 03651

(51) Int. Cl.
*G02C 7/02* (2006.01)
*G02C 13/00* (2006.01)
(Continued)

(52) U.S. Cl.
CPC ............ *G02C 7/024* (2013.01); *B24B 9/144* (2013.01); *B24B 9/148* (2013.01); *B24B 49/00* (2013.01); *G02C 13/003* (2013.01); *G02C 13/005* (2013.01)

(58) Field of Classification Search
CPC ..... G02C 13/003; G02C 13/005; G02C 7/024; B24B 9/144; B24B 9/146; B24B 9/148; B24B 49/00
(Continued)

(56) References Cited

U.S. PATENT DOCUMENTS

| | | | |
|---|---|---|---|
| 2010/0312573 A1* | 12/2010 | Haddadi | B24B 9/144 705/1.1 |
| 2011/0141435 A1* | 6/2011 | Dubois | B24B 1/00 351/159.74 |

(Continued)

FOREIGN PATENT DOCUMENTS

| | | |
|---|---|---|
| EP | 1 642 678 A1 | 4/2006 |
| EP | 2 305 423 A1 | 4/2011 |

OTHER PUBLICATIONS

International Search Report, dated Feb. 26, 2013, from corresponding PCT application.

*Primary Examiner* — Jordan Schwartz
(74) *Attorney, Agent, or Firm* — Young & Thompson

(57) ABSTRACT

A method of preparing an ophthalmic lens (30) to be fitted into a surround of a spectacle frame, includes: acquiring a longitudinal profile (50) of the surround; centering the longitudinal profile; acquiring the geometry of at least one part of an optical face of the ophthalmic lens; calculating a treatment setpoint for treating the ophthalmic lens; and treating the ophthalmic lens. The acquiring operation includes a step of calculating the bidimensional coordinates of a plurality of measurement points (P'i, P''i) situated along two distinct longitudinal strands (51, 52) which are chosen (Continued)

in such a way that they define between them a band which extends along the longitudinal profile, and a step of examining the ophthalmic lens to acquire the tridimensional coordinates for the measurement points with a view to calculating the treatment setpoint.

9 Claims, 3 Drawing Sheets

(51) Int. Cl.
*B24B 9/14* (2006.01)
*B24B 49/00* (2012.01)

(58) Field of Classification Search
USPC .............. 351/159.73, 159.75, 178; 33/200
See application file for complete search history.

(56) References Cited

U.S. PATENT DOCUMENTS

| | | |
|---|---|---|
| 2011/0149234 A1 | 6/2011 | Biton et al. |
| 2012/0133886 A1* | 5/2012 | Biton ............... B24B 49/00 351/159.74 |

\* cited by examiner

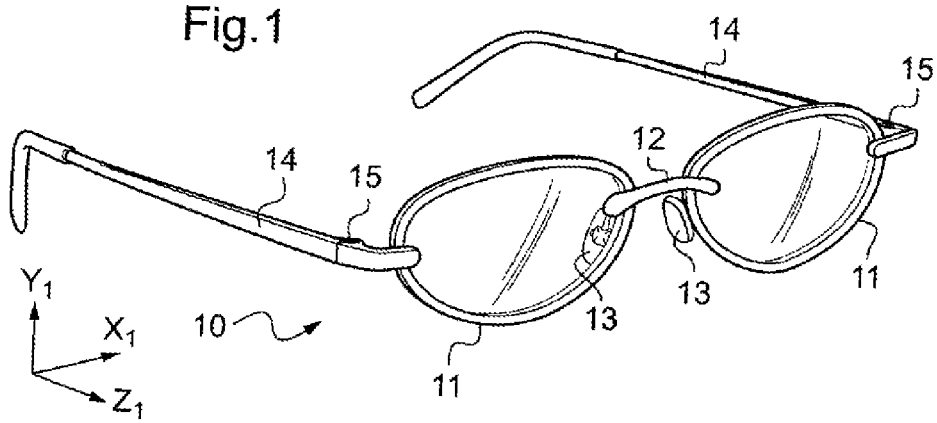
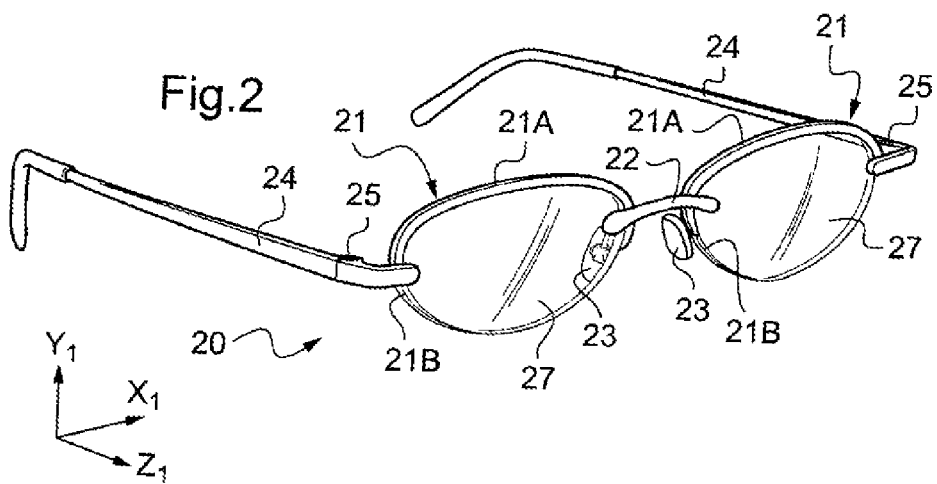
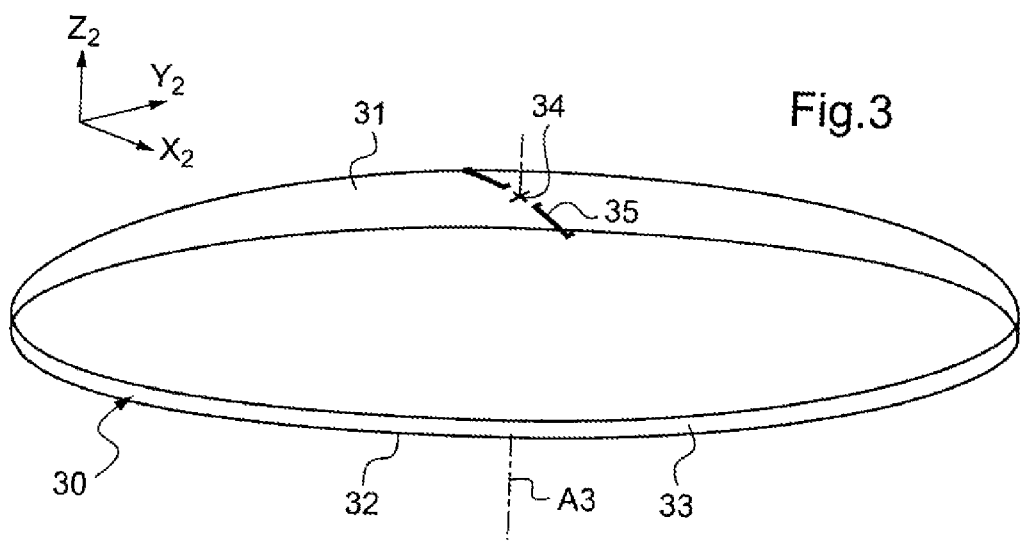

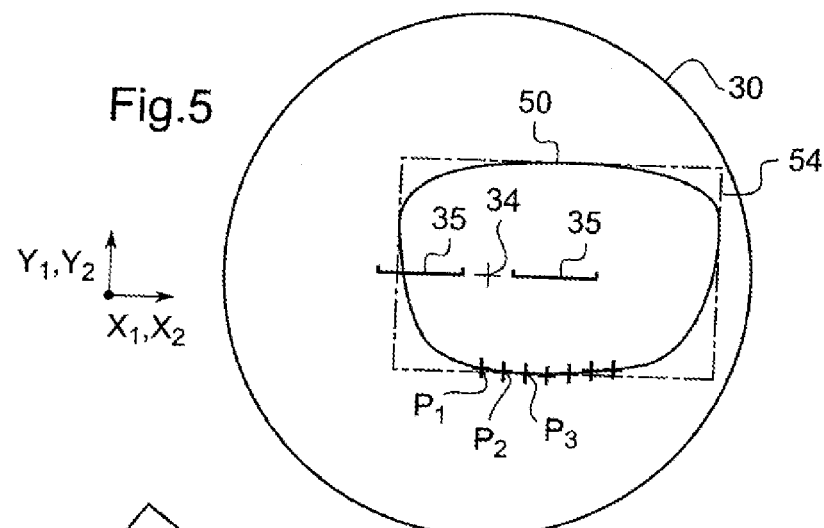
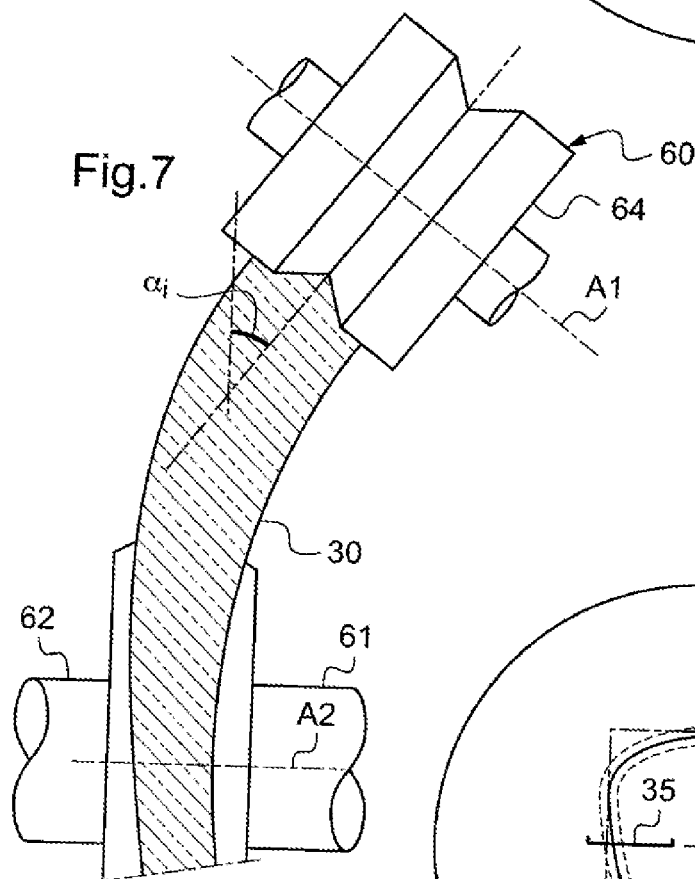
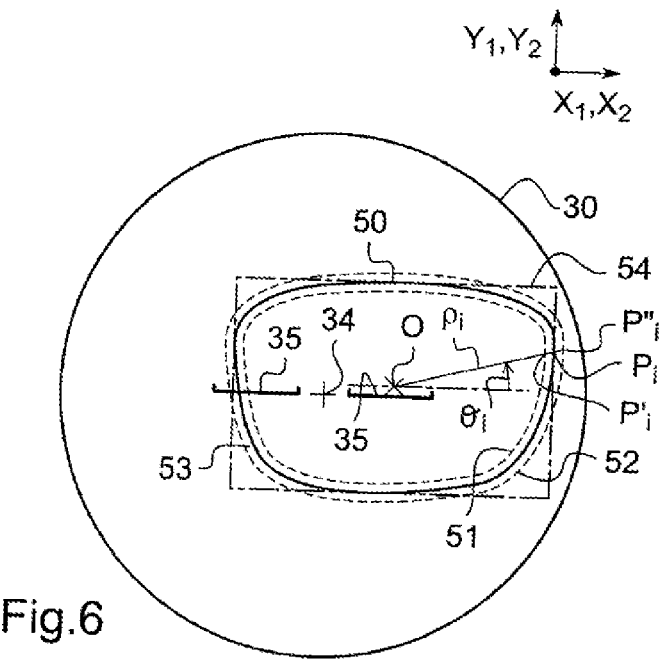

METHOD OF PREPARING AN OPHTHALMIC LENS

TECHNICAL FIELD OF THE INVENTION

The present invention relates in a general way to the preparation of blank ophthalmic lenses, i.e. to lenses that have yet to be trimmed to the shape of the rims in which they are intended to be fitted.

The invention more particularly relates to a method for preparing an ophthalmic lens to be fitted into a rim of a spectacle frame, comprising:

an operation for determining the two-dimensional geometry of a longitudinal profile of said rim;

a centering operation in which said longitudinal profile is positioned in a frame of reference related to the ophthalmic lens;

an operation for acquiring the geometry of at least one portion of an optical face of the ophthalmic lens, by contact or contactless probing of said longitudinal profile on said optical face of the ophthalmic lens;

an operation for calculating instructions for processing of the ophthalmic lens depending on the geometry and position of the longitudinal profile in the frame of reference related to the ophthalmic lens, and depending on the geometry of said portion of said optical face of the ophthalmic lens; and an operation for processing the ophthalmic lens according to said processing instructions.

PRIOR ART

The technical part of the work of an optician consists in mounting a pair of ophthalmic lenses in a spectacle frame selected by a wearer.

This mounting operation can be divided into three main operations:

acquiring the outlines of the rims of the selected spectacle frame;

centering the lenses, which consists in transferring the two acquired outlines to the two ophthalmic lenses, in such a way that once trimmed along these two outlines and mounted in the spectacle frame, these lenses are suitably centered facing the pupils of the wearer; then machining the lenses, which consists in cutting them along these outlines.

In the context of the present invention, it is more particularly a question of rimmed spectacles, i.e. full-rimmed and half-rimmed (i.e. "arcked") spectacle frames.

For these frames, the concrete objective of the optician is to cut the ophthalmic lenses so that they mechanically and aesthetically match the shapes of the rims, while ensuring that these lenses exercise as best as possible the optical functions for which they were designed.

The machining operation in particular comprises, in the case of full-rimmed spectacles, a beveling step that allows a fitting rib (commonly called a bevel) to be formed on the edge face of the lens, which fitting rib can be fitted into a groove (commonly called a bezel) that runs along the inner face of the corresponding rim of the frame.

In contrast, in the case of half-rimmed frames, the machining operation comprises a grooving step allowing a fitting groove to be formed on the edge face of the lens. When the lens is mounted in the frame, this fitting groove engages with a rib that runs along the inner face of the corresponding half-rim (or "arc") of the frame. The ophthalmic lens is then held pressed against this arc using a wire, generally made of nylon (optionally of metal), that engages in the fitting groove and the ends of which meet the ends of the arc.

Whatever the type of spectacle frame selected, the acquiring and machining operations must be carried out with care if the lens is to fit perfectly into its rim, attractively, without effort and "the first time round", i.e. without additional machining or lengthening of the nylon wire being required.

Despite the care taken with the various operations, problems arise post-trimming with the fitting of the lens or with the appearance of the fitted lens.

It may then prove to be necessary, to remove any risk of the lens slipping from its rim, to rework the lens and/or modify the length of the nylon wire, which in practice proves difficult to do.

Thus, it is known, to improve the quality of the trimming of the ophthalmic lens, to acquire, from a database available to the optician, a map of the front and back faces of the lenses, in order to allow the fitting of the lenses in their rims to be modeled and the lenses to be trimmed depending on the result of this model.

The major drawback of this solution is that it requires an up-to-date database available to the optician, which in practice is rarely the case. Specifically, making such a database available is generally judged to conflict with the degree of confidentiality relating to the shapes of the lenses.

SUBJECT OF THE INVENTION

In order to remedy the aforementioned drawback of the prior art, the present invention provides a method allowing at least one portion of the surface of an ophthalmic lens to be modeled without recourse to a database.

More particularly, according to the invention a method is provided such as defined in the introduction, in which said acquiring operation comprises:

a step of calculating, depending on the two-dimensional geometry of said longitudinal profile, two-dimensional coordinates of a plurality of measuring points located along two separate longitudinal traces that are arranged on either side of the longitudinal profile and that are chosen such that they define between each other a strip that extends along said longitudinal profile; and a step of examining said optical face of the ophthalmic lens in order to acquire the three-dimensional coordinates of said measuring points, with a view to calculating said processing instructions.

Thus, by virtue of the invention, the optical face of the lens is examined so as to acquire the coordinates of points located near the longitudinal profile, thereby making it possible to produce a map of said strip in order to allow in particular the curvature of the lens in the region where the lens must be trimmed to be approximated.

It is thus possible to process the lens (to trim the lens, for example) with greater precision, taking into account this curvature.

The following are other advantageous and nonlimiting features of the method according to the invention:

in the determining operation, the two-dimensional coordinates of a plurality of elementary points are acquired, which points belong to the longitudinal profile and characterize the two-dimensional geometry of the longitudinal profile, and, in the calculating step, the measuring points chosen are each homologous with one of the elementary points of the longitudinal profile;

the two longitudinal traces are homotheties of the longitudinal profile;

the two longitudinal traces are constant difference transformations of the longitudinal profile;

in the examining step, said optical face of the ophthalmic lens is probed along the two longitudinal traces;

in the examining step, said optical face of the ophthalmic lens is also probed along the longitudinal profile in order to acquire the three-dimensional coordinates of elementary points of this longitudinal profile with a view to calculating said processing instructions;

in the examining step, the three-dimensional coordinates of three points of the other optical face of the ophthalmic lens are acquired, and the radius of curvature of this other optical face is deduced therefrom with a view to calculating said processing instructions;

the processing operation comprises a step of trimming the ophthalmic lens; and the processing operation comprises a step of etching and/or stamping the ophthalmic lens.

BRIEF DESCRIPTION OF THE DRAWINGS

The following description, given with regard to the appended drawings, by way of nonlimiting example, will allow what the invention consists of and how it can be carried out to be understood.

In the appended drawings:

FIG. 1 is a schematic perspective view of a full-rimmed spectacle frame;

FIG. 2 is a schematic perspective view of a half-rimmed spectacle frame;

FIG. 3 is a schematic perspective view of a blank ophthalmic lens;

FIG. 5 is a front view of the ophthalmic lens in FIG. 3, on which a two-dimensional longitudinal profile representing the shape of one of the rims of the spectacle frame in FIG. 1 or 2 is shown;

FIG. 6 is a homologous view to that in FIG. 5, in which the longitudinal traces defined in the present invention are moreover shown; and FIG. 7 is an axial cross-sectional view of the ophthalmic lens in FIG. 3 during its beveling.

DETAILED DESCRIPTION OF THE PREFERRED EMBODIMENTS

Figure 4:
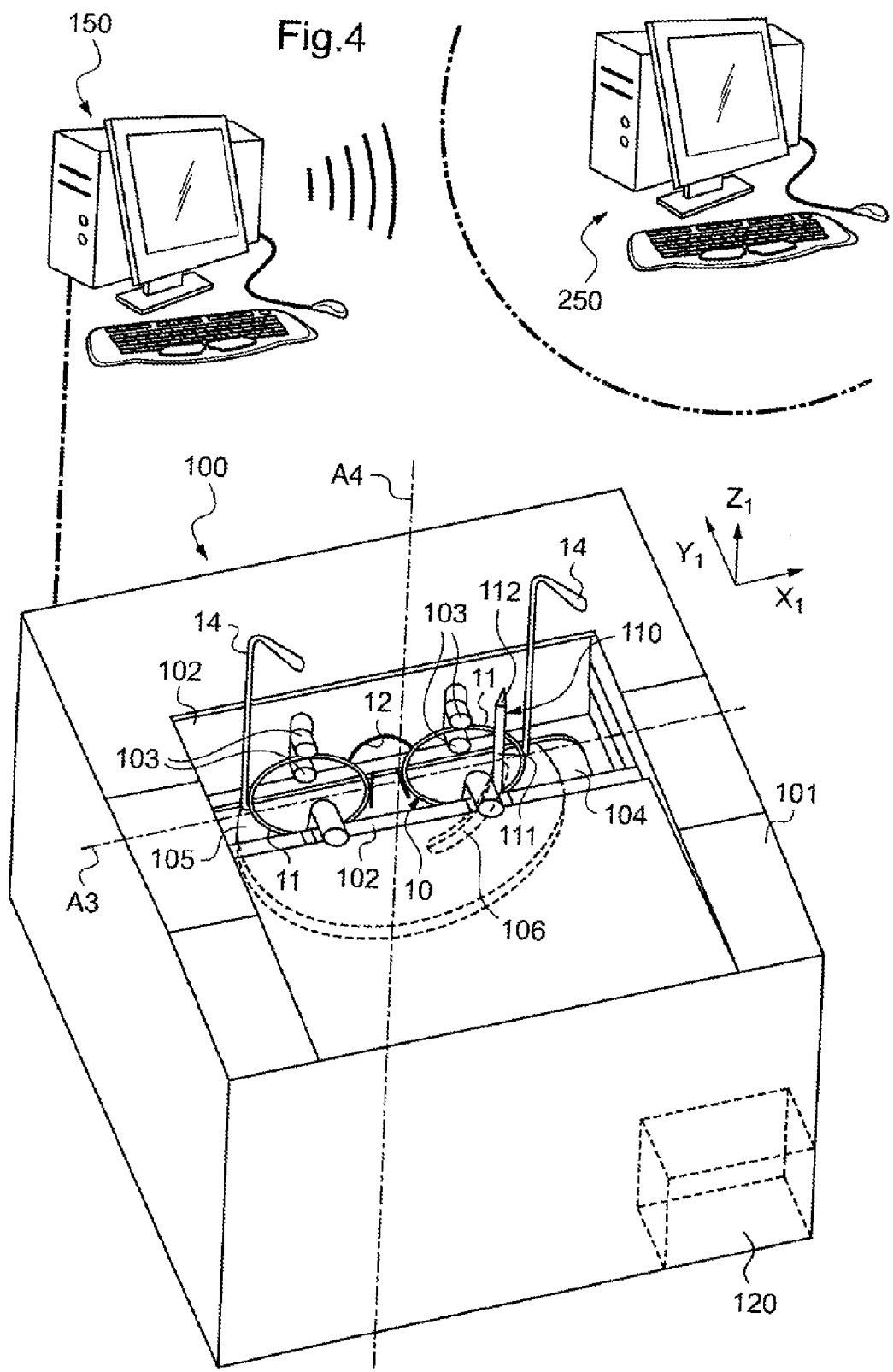
FIG. 4 is a schematic perspective view of an apparatus for reading outlines.

FIGS. 1 and 2 show a full-rimmed spectacle frame 10 and a half-rimmed spectacle frame 20, respectively, each of which comprises two rims 11, 21.

More particularly, in FIG. 1, the full-rimmed spectacle frame 10 comprises two full rims 11 that are each intended to receive an ophthalmic lens and be positioned facing one of the two eyes of the wearer when the latter is wearing said frame.

The two full rims 11 are connected to each other by a bridge 12. Furthermore, they are each equipped with a nose pad 13 able to rest on the nose of the wearer, and with a temple 14 able to rest on one of the ears of the wearer. Each temple 14 is hinged to the corresponding full rim by means of a hinge 15.

Both full rims 11 of the spectacle frame 10 have an internal edge in which a fitting groove, commonly called a bezel, of generally dihedral-shaped cross-section, is housed.

In FIG. 2, the rims 21 of the half-rimmed spectacle frame 20 each comprise an arc 21A (or "semicircle") and a nylon wire 21B, the two ends of which are connected to the ends of this arc 21A. These arcs 21A and the nylon wires 21B together allow the two lenses to be held in the spectacle frame 20.

The two arcs 21A are connected to each other by a bridge 22. Each arc 21A is equipped with a nose pad 23 able to rest on the nose of the wearer, and with a temple 24 able to rest on one of the ears of the wearer. Each temple 24 is hinged to the corresponding arc 21A by means of a hinge 25.

The two arcs 21A of the spectacle frame 20 have an internal edge over which a fitting rib runs.

Such as shown in FIG. 2, the spectacle frame 20 bears two presentation lenses 27 delivered to the optician with the frame. The shape of these two presentation lenses 27 will be used as a stencil when trimming the ophthalmic lenses to be mounted in the spectacle frame 20.

As FIG. 3 shows, the ophthalmic lens 30 has a front optical face 31, a back optical face 32 and an edge face 33.

Here, the front optical face 31 is spherical and has a known radius of curvature.

In contrast, the back optical face 32 has a specific shape allowing the lens to correct with precision the visual acuity of the future spectacle wearer.

The edge face 33 of the lens has an initially circular outline. However, the lens is intended to be trimmed to the shape of the corresponding rim 11, 21 of the spectacle frame 10, 20 in order to be fitted into the latter.

In the case where the selected frame is a full-rimmed frame (FIG. 1), the ophthalmic lens 30 is more precisely intended to be trimmed so as to present, on its edge face 33, a fitting rib (or bevel) able to fit into the bezel of the corresponding full rim 11 of the spectacle frame 10.

In the case where the selected frame is a half-rimmed frame (FIG. 2), the ophthalmic lens 30 is in contrast intended to be trimmed so as to present, on its edge face 33, a fitting groove that is able to engage with the fitting rib of the corresponding arc 21A of the spectacle frame, and that is able to receive the nylon wire 21B.

This ophthalmic lens 30 is provided with marks 34, 35 that make it easy to identify the optical frame of reference of the ophthalmic lens 30 when mounting it in the spectacle frame 10, 20 selected by the wearer. Here, these marks consist of temporary ink marks 34, 35. They could, as a variant, consist of permanent marks such as micro-etchings.

Here, these marks comprise a centering cross 34 allowing the position of the center point of the lens, i.e., in the case of a lens providing exclusively spherical optical power, the point where an incident ray and the transmitted ray have the same axis, to be located.

Furthermore, it comprises, on either side of this centering cross 34, two horizon lines 35 indicating the horizontal of the ophthalmic lens 30.

The optical frame of reference of the ophthalmic lens 30 is characterized by an orthonormal coordinate system comprising a horizontal axis X2 parallel to said horizon lines 35, a y-axis Y2, and a normal axis Z2 that is parallel to the general axis A3 of the lens (this general axis being perpendicular to the plane tangent to the front face of the ophthalmic lens 30 at the centre point 34).

The invention is particularly advantageous when lens preparation is entrusted to lens manufacturers that are independent from the optician, i.e. when the optician acts as "contractor" that subcontracts the manufacturing and trimming of the lenses to such manufacturers.

Here, to illustrate this configuration, consideration is given, on the one hand, to a client terminal for ordering lenses, installed at an opticians, and on the other hand, to a manufacturing terminal for manufacturing and trimming lenses, installed on the premises of a lens manufacturer.

The client terminal comprises an information-processing unit 150 (FIG. 4), here a desktop computer, for recording and transmitting ophthalmic lens order data, for example via an IP (Internet) communication protocol. These order data comprise prescription data relating to the corrections to be made to the eyes of the wearer, and shape data relating to the spectacle frame 10, 20 selected by the wearer.

As for the manufacturing terminal, it comprises an information-processing unit 250 for receiving, recording and processing the order data transmitted by the client terminal. It furthermore comprises a device for trimming lenses in accordance with the shape data.

Here the optician has an apparatus for reading outlines at their disposal in the client terminal. This apparatus for reading outlines is a means well known to those skilled in the art and is not in its own right the subject of the described invention. It is for example possible to use an apparatus for reading outlines such as described in patent EP 0 750 172 or sold by Essilor International under the trade name Kappa or under the trade name Kappa CT.

FIG. 4 is a general view of this apparatus 100 for reading outlines, such as seen by its user. This apparatus comprises a top cover 101 that covers all of the apparatus except for a central top portion in which a spectacle frame 10 or a presentation lens 27 may be placed.

The apparatus 100 for reading outlines is intended to acquire, in the case where the selected spectacle frame is a full-rimmed frame, the shape of the bottom edge of the bezel of each full rim 11 of this spectacle frame 10. In contrast, in the case where the spectacle frame selected is a half-rimmed frame, it is intended to acquire the shape of the outline of each presentation lens 27.

For this purpose, the apparatus 100 for reading outlines comprises first means for immobilizing a full-rimmed spectacle frame 10, and second means for immobilizing a presentation lens 27.

The first immobilizing means comprise a set of two jaws 102 that are able to move relative to each other, in order to form a clamping device. Each of the jaws 102 is equipped with two pairs of pads 103 that are able to move and form two clips suitable for clamping the spectacle frame 10 in order to immobilize it.

The second immobilizing means, not shown in the figures, comprise a lug that extends as far as into the central top portion of the apparatus, and the top end of which is arranged to interact with one of the faces of the presentation lens 27, in order to immobilize it in this central top portion.

In the space visible through the aperture in the cover 101, a frame 104 may be seen. A platen (not shown) may move in translation over this frame 104 along a transfer axis A3. On this platen a turntable 105 is rotatably mounted.

This turntable 105 is therefore able to occupy three positions on the transfer axis A3, namely:

a first position in which the center of the turntable 105 is placed between the two pairs of pads 103 fastening the right-hand full rim of the spectacle frame 10 in place;

a second position in which the center of the turntable 105 is arranged between the two pairs of pads 103 fastening the left-hand full rim of the spectacle frame 10 in place; and a third intermediate position in which the center of the turntable 105 is located along the axis of the fastening lug of the presentation lens 27.

The turntable 105 possesses an axis of rotation A4 defined as the axis normal to the front face of this turntable 105 and passing through its center. It is adapted to pivot about this axis relative to the platen. The turntable 105 moreover comprises a circularly arcuate oblong window 106 through which a probe 110 protrudes. This probe 110 comprises a supporting shank 111, of axis perpendicular to the plane of the front face of the turntable 105, and, at its free end, a probing finger 112 of axis perpendicular to the axis of the supporting shank 111.

The probing finger 112 is arranged to follow, by sliding or optionally rolling, the bottom edge of the bezel of each full rim 11 of the spectacle frame 10.

As for the supporting shank 111, it is arranged to slide along the outline of the presentation lens 27.

The apparatus 100 for reading shape comprises actuating means (not shown) adapted firstly to slide the supporting shank 111 along the window 106 in order to modify its radial position relative to the axis of rotation A4 of the turntable 105, secondly to make the angular position of the turntable 105 vary about its axis of rotation, and thirdly to vary the altitude of the probing finger 112 of the probe 110 relative to the plane of the front face of the turntable 105.

To summarize, the probe 110 has three degrees of freedom, a first degree of freedom $\rho$ of which consists of the ability of the probe 110 to move radially relative to the axis of rotation A4 by virtue of its freedom to move along the circular arc formed by the window 106, a second degree of freedom $\theta$ of which consists of the ability of the probe 110 to pivot about the axis of rotation A4 by virtue of rotation of the turntable 105 relative to the platen, and a third degree of freedom z that consists of the ability of the probe 110 to move translationally along an axis parallel to the axis of rotation A4 of the turntable 105.

Each point read by the end of the probing finger 112 of the probe 110 is located in a frame of reference called the worn frame of reference of the frame.

Here this frame of reference is characterized by an orthonormal coordinate system comprising a horizontal axis X1 parallel to said transfer axis A3, a y-axis Y1 orthogonal to the transfer axis A3 and the rotation axis A4, and a normal axis Z1.

The apparatus 100 for reading outlines furthermore comprises an electronic and/or information-processing device 120 allowing, on the one hand, the actuating means of the apparatus 100 for reading shape to be controlled, and on the other hand, the coordinates of the end of the probing finger 112 of the probe 110 to be acquired and transmitted to the information-processing unit 150.

The method for preparing an ophthalmic lens 30 with a view to mounting it in a rim 11, 21 of a spectacle frame 10, 20 comprises two main phases, including a first phase of compiling trimming instructions, and a second phase of trimming the ophthalmic lens according to these trimming instructions.

The second trimming phase generally involves carrying out three operations in succession, namely:

a rough trimming operation that consists in trimming the initially circular outline of the ophthalmic lens to a shape close to the desired shape, i.e. to a shape close to that of the rim of the selected spectacle frame;

a finishing operation that consists in forming a fitting rib or a fitting groove on the edge face of the ophthalmic lens with a view to mounting it in a full-rimmed or half-rimmed spectacle frame, respectively; and a post-finishing operation that consists in polishing the edge face of the lens and/or chamfering its sharp edges.

Since the invention more specifically relates to the first phase of compiling trimming instructions, this second trimming phase, well known to those skilled in the art, will not be described in further detail here.

The first phase of compiling trimming instructions is divided into six successive operations.

The first operation consists in defining the needs of the spectacle wearer.

To do this, the wearer visits an opticians.

As for the optician, they ask the wearer to select a spectacle frame 10, 20 that he/she likes, here a full-rimmed or half-rimmed spectacle frame. The optician then carries out the measurements required to center the ophthalmic lenses in the selected frame, so that, once fitted in the frame, the lenses will be correctly centered opposite the eyes of the wearer and will exercise as best as possible the optical functions for which they were designed.

The optician in particular determines the position of the pupil points of the wearer in the worn frame of reference of the frame. These pupil points correspond to the points located opposite the pupils of the wearer on the lenses when fitted in the selected frame. The pupil points are more particularly located relative to the outline of each rim 11, 21 of the selected spectacle frame 10, 20, by means of two parameters called the pupil distance and pupil height. Pupil distance corresponds to the largest horizontal distance between the pupil point and the nasal zone of the rim. Pupil height corresponds to the largest vertical distance between the pupil point and the bottom zone of the rim.

The second operation consists in acquiring the shapes of the outlines of the rims 11, 21 of the selected spectacle frame 10, 20.

This acquiring step may be carried out in various ways.

Here it is carried out by probing the full rims 11 of the full-rimmed spectacle frame 10 or the presentation lenses 27 of the half-rimmed spectacle frame 20.

This acquiring step is here carried out using the apparatus 100 for reading outlines shown in FIG. 4.

To do this, the spectacle frame 10 or the presentation lens 27 is initially immobilized in the first or second immobilizing means of the apparatus 100 for reading outlines.

If it is a question of a full-rimmed spectacle frame, the latter is immobilized such that each of its full rims 11 is set to be probed along a path that starts between the two pads 103 clamping the lower part of the corresponding full rim 11 of the frame, and that follows the bezel of the full rim 11 in order to cover the entire circumference of this full rim 11.

In the initial position, when the probing finger 112 is placed between the two pads 103, the electronic and/or information-processing device 120 sets to zero the angular position $\theta_1$ and the altitude $z_1$ of the end of the probing finger 112 of the probe 110.

The actuating means then make the turntable 105 pivot through one complete revolution. While the turntable is pivoting, the actuating means apply a constant radial force to the probe 110 in the direction of the full rim 11, so that the probing finger 112 of the probe 110 slides along the bottom edge of the bezel of the full rim 11 without climbing along the front and back sidewalls of the bezel.

The electronic and/or information-processing device 120 acquires, during the rotation of the turntable 105, the spatial coordinates $\rho_i, \theta_i, z_i$ of a plurality of points $Q_i$ of the bottom edge of the bezel (for example 60 points separated angularly by 6 degrees), located in the coordinate system $X_1, Y_1, Z_1$, which together define a longitudinal profile 50 of the rim 11.

If it is a question of a half-rimmed spectacle frame, one of its presentation lenses 27 is immobilized in the center of the central top aperture of the cover 101, in such a way that its edge face can be probed over the entirety of its outline by the supporting shank 111.

In the initial position, when the supporting shank 111 is placed against the edge face of the presentation lens 27, the electronic and/or information-processing device 120 sets to zero the angular position $\theta_1$ of the probe 110.

The actuating means then make the turntable 105 pivot. While the turntable is pivoting, the actuating means apply a constant radial force to the probe 110 in the direction of the axis of rotation A4, so that the supporting shank 111 of the probe 110 remains in contact with the edge face of the presentation lens 27.

The electronic and/or information-processing device 120 acquires, during the rotation of the turntable 105, the planar coordinates $\rho_i, \theta_i$ of a plurality of points $P_i$ of the edge face of the presentation lens 27 (for example 60 points separated angularly by 1 degree). These 60 probed points $P_i$ here also define a longitudinal profile of the rim 21 of the half-rimmed spectacle frame.

Next, independently of whether the selected spectacle frame is full-rimmed or half-rimmed, the planar coordinates $\rho_i, \theta_i$ of the 60 probed points $P_i$ are then transmitted by the electronic and/or information-processing device 120 to the information-processing unit 150 of the client terminal.

Of course, this acquiring step could also be carried out in another way.

It could for example be carried out using a database register. For this purpose, such a register would comprise a plurality of records that would each be associated with a spectacle frame model and that would each contain the coordinates of a plurality of points characterizing the shapes of the rims of this spectacle frame model.

After this second operation, the information-processing unit 150 of the client terminal transmits all the acquired data to the information-processing unit 250 of the manufacturing terminal.

These data are then used to trim the ophthalmic lenses in order to bring their outlines to the desired shape, as will be detailed below in the rest of the description.

The third operation consists in centering and orienting the longitudinal profile 50 of the rim 11, 21 on the ophthalmic lens 30 in such a way that, once fitted in the spectacle frame, the lens trimmed along this longitudinal profile 50 is suitably centered opposite the pupil of the corresponding eye of the wearer.

In the centering step, as FIG. 5 shows, it is a question of making the worn frame of reference of the spectacle frame 10, 20 coincide with the optical frame of reference of the ophthalmic lens 30.

This coincidence is achieved by aligning the horizontal axes $X_1, X_2$, the y-axes $Y_1, Y_2$, and the normal axes $Z_1, Z_2$ of the coordinate systems associated with these two frames of reference, then by centering the pupil point (and therefore the longitudinal profile 50) located in the coordinate system $X_1, Y_1, Z_1$ of the frame on the center point 34 located in the coordinate system $X_2, Y_2, Z_2$ of the lens.

In the orientation step, it is a question of orienting the longitudinal profile 50 of the rim 11, 21 around the center point 34 at an angle set relative to the horizon lines 35 of the ophthalmic lens 30. This angle is chosen depending on the prescriptions of the wearer. It makes it possible to ensure that, once the lens is mounted in the rim, the distribution of its optical power is suitable for the corresponding eye of the wearer. Such as shown in FIG. 5, the angle chosen is zero degrees.

The invention then more particularly relates to the fourth, fifth and sixth operations.

At this stage, as FIG. 6 shows, the two-dimensional coordinates ($\rho_i$, $\theta_i$) of the points $P_i$ of the longitudinal profile 50 are known in the coordinate system (O, $X_2$, $Y_2$, $Z_2$) related to the ophthalmic lens 30.

Here, the origin O of this coordinate system corresponds to the center of the boxing system box 54 of the longitudinal profile.

Specifically, it will be recalled that the boxing system box 54 is a rectangle that is drawn around the longitudinal profile 50, and two sides of which lie parallel to the horizontal.

The fourth operation then consists in mapping a portion of at least one of the two optical faces 31, 32 of the ophthalmic lens 30.

In the present case, this operation here more precisely consists in mapping the back optical face 32 of the ophthalmic lens 30, over a strip 53 of set width that extends along the projection of the longitudinal profile 50 onto the back optical face of the lens (this projection from now on being referred to as the "longitudinal profile 50" for the sake of simplicity).

Specifically, here the spherical shape of the front optical face 31 of the lens is already known and therefore does not need to be mapped.

Only mapping a strip 53 of the back face of the lens thus makes it possible to rapidly obtain data that will subsequently allow the trimming of the lens to be optimized.

This mapping operation is carried out using a probing apparatus that is adapted to probe the optical faces of the lenses.

Since the architecture of this probing apparatus does not form part of the subject matter of the present invention, it will not be described in further detail.

It will merely be mentioned that this probing apparatus comprises at least:

one lens holder, for example formed by two shafts for clamping and driving the ophthalmic lens 30 rotationally about the general axis A3;

a probing means, for example formed by an arm that is able to move translationally along an axis parallel to the general axis A3 (so that its end can make contact with the back optical face 32 of the ophthalmic lens 30), and able to move translationally along a radial axis relative to the general axis A3 (so that its end can be distanced from the general axis A3 in order to allow any other point of the back optical face 32 of the lens to be probed); and a sensor allowing the exact position of the end of the probing arm to be located in order to acquire the coordinates of any point of the back optical face 32 of the lens.

The fourth operation is carried out in two steps called the calculating step and the examining step.

In brief, the calculating step consists in determining the two-dimensional coordinates ($\rho'_i$, $\theta'_i$) and ($\rho''_i$, $\theta''_i$) of a plurality of measuring points $P'_i$, $P''_i$ located on the back optical face 32 of the ophthalmic lens 30, along two longitudinal traces 51, 52 that bound between them said strip 53 that it is desired to map.

As for the examining step, it consists in acquiring the three-dimensional coordinates ($\rho'_i$, $\theta'_i$, $z'_i$) and ($\rho''_i$, $\theta''_i$, $z''_i$) of said measuring points $P'_i$, $P''_i$, and optionally the three-dimensional coordinates ($\rho_i$, $\theta_i$, $z_i$) of the points $P_i$ of the longitudinal profile 50.

In the calculating step, the distance separating the two longitudinal traces 51, 52 chosen is large enough for them to bound a mapped strip 53 that is wide enough to allow, with a view to the trimming of the ophthalmic lens 30, exploitable results to be obtained.

Here, the two longitudinal traces 51, 52 are located on either side of the longitudinal profile 50, and are the result of two homothetic transformations of origin O and of ratio $Rh_{51}$, $Rh_{52}$.

The homothetic ratio $Rh_{51}$ of one of the transformations, that producing the longitudinal trace 51, is preferably comprised between 0.7 and 0.95, and here is equal to 0.85.

The homothetic ratio $Rh_{52}$ of the other of the transformations, that producing the longitudinal trace 52, is preferably comprised between 1.05 and 1.3, and here is equal to 1.15.

In practice, the information-processing unit 250 of the manufacturing terminal obtains the two-dimensional coordinates ($\rho'_i$, $\theta'_i$) and ($\rho''_i$, $\theta''_i$) of the measuring points $P'_i$, $P''_i$ using the following calculation:

For i ranging from 1 to 60, $\rho'_i = Rh_{51} \cdot \rho_i$ $\rho''_i = Rh_{52} \cdot \rho_i$ $\theta_i = \theta'_i = \theta''_i$.

In the examining step, the probing arm is then controlled such that its end slides over the back optical face 32 of the ophthalmic lens 30, along the longitudinal profile 50, then along each of the two longitudinal traces 51, 52, so as to acquire the altitudes $z_i$, $z'_i$, $z''_i$ of the points of the longitudinal profile 50 and of the two longitudinal traces 51, 52.

Thus, a map of the strip 53 of the back optical face 32 of the ophthalmic lens 30 is obtained.

The fifth operation consists in determining the trimming instructions for the ophthalmic lens 30, depending on:

the two-dimensional or three-dimensional geometry of the longitudinal profile 50;

on the position of the longitudinal profile 50 in the frame of reference $X_2$, $Y_2$ related to the ophthalmic lens; and on the geometry of the back optical face 32 of the ophthalmic lens 30, along the mapped strip 53.

It is followed by a sixth operation for trimming the ophthalmic lens 30 according to said trimming instructions.

These operations will be carried out differently depending on the architecture of the trimming device used.

By way of illustrative and nonlimiting example, a grinder 60 of the type shown in FIG. 7 will possibly be used, this grinder 60 comprising:

a lens holder, for example formed by two shafts 61, 62 for clamping and driving the ophthalmic lens 30 rotationally about an axis A2; and a beveling wheel 63 driven rotationally about an axis A1 and movably mounted in such a way that the orientation and distance of its axis A1 relative to the axis A2 may be adjusted.

With such a device, provision may be made for the fifth operation to comprise a step of calculating the angle of curvature $\alpha_i$ of the lens at each point $P_i$ of the longitudinal profile 50, especially using the coordinates of the measuring points $P'_i$, $P''_i$.

The sixth step will then possibly comprise a step of beveling the ophthalmic lens 30 following the longitudinal profile 50, in such a way that at each point $P_i$ of the longitudinal profile 50, the axis A1 of the beveling grinder 63 is inclined at an angle equal to the angle of curvature $\alpha_i$.

Thus, the beveled lens will comprise, at the end of these operations, a bevel having an optimal orientation on its edge face.

Likewise, if the lens is intended to be mounted in a half-rimmed spectacle frame (FIG. 2), its edge face therefore needing to be grooved, it will be possible, by virtue of the invention, to incline this groove so as to ensure an optimal mounting of the lens in its frame.

Of course, the lens could, according to the invention, be trimmed in various ways provided that the altitudes $z'_i$, $z''_i$ of the measuring points of the two longitudinal traces 51, 52 are used to improve the quality of the trimming of the lens.

The present invention is in no way limited to the embodiment described and shown.

By way of example, provision could be made for the longitudinal traces, which bound the strip to be mapped, to be obtained, not from two homothetic transformations, but rather from two constant difference transformations.

In practice, the information-processing unit 250 of the manufacturing terminal would then obtain the two-dimensional coordinates $(\rho'_i, \theta'_i)$ and $(\rho''_i, \theta''_i)$ of the measuring points $P'_i$, $P''_i$ using the following calculations:

For i ranging from 1 to 60, $$\rho'_i = \pi_i - C_{51}$$

$$\rho''_i = \rho_i + C_{52}$$

$\theta_i = \theta'_i = \theta''_i$, where $C_{51}$ and $C_{52}$ are two preset constants.

Provision could also be made for the strip to be mapped to lie not on either side of the longitudinal profile, but instead only on one side of this profile. Provision could in particular be made for the strip to be mapped to be bounded on one side by the longitudinal profile itself.

Provision could also be made for the distance between the longitudinal profile and the two longitudinal traces to vary discontinuously. In particular, provision could be made for this distance to be equal to a first constant in the top and bottom portions of the longitudinal profile, and for it to be equal to a second constant (different from the first) in the temporal and the nasal portions of the longitudinal profile.

According to another variant embodiment of the invention, provision will possibly be made for the altitudes of the measuring points on the back optical face of the ophthalmic lens to be acquired, not by contact probing, but by contactless probing, for example using optical (laser, deflectometry, etc.) measuring means.

Of course, the altitudes of a larger number or a smaller number of measuring points could also be acquired. Of course, the number of measuring points will also possibly be different from the number of points acquired along the bezel. Thus, in order to ensure precise trimming of the lens along the longitudinal profile, the coordinates of 360 points of the bezel will possibly be acquired, and, in order to obtain a sufficiently precise map of said strip, due to the way in which it will be employed in the trimming of the lens, the coordinates of about fifty measuring points will be acquired on each longitudinal trace.

As another variant, provision could be made for the altitudes of the measuring points to be used, not in the trimming of the ophthalmic lens, but rather in other steps of processing the lens, such as in operations for etching and/or stamping centering marks on the ophthalmic lens, so as to position these marks with a high degree of precision taking account of the shape of the lens.

The invention claimed is:

1. A method for preparing an ophthalmic lens to be fitted into a rim of a spectacle frame, comprising:
    an operation for determining the two-dimensional geometry of a surround profile of said rim;
    a centering operation in which said surround profile is centered in a frame of reference related to the ophthalmic lens;
    an operation for acquiring the geometry of at least one portion of an optical face of the ophthalmic lens by overlaying the surround profile of the rim on the optical face of the lens and by contact or contactless probing of said surround profile as overlaid on said optical face of the ophthalmic lens;
    an operation for determining instructions for processing of the ophthalmic lens depending on the geometry and position of the surround profile in the frame of reference related to the ophthalmic lens, and depending on the geometry of said portion of said optical face of the ophthalmic lens; and
    an operation for processing the ophthalmic lens according to said processing instructions,
    wherein said acquiring operation comprises:
        a step of calculating, depending on the two-dimensional geometry of said surround profile, two-dimensional coordinates of a plurality of measuring points located on the optical face of the lens along two separate surround traces that are arranged on both sides of said surround profile and that are chosen such that they define between each other a strip that bounds along said surround profile; and
        a step of examining said optical face of the ophthalmic lens in order to acquire the three-dimensional coordinates of said measuring points,
    and wherein said processing instructions are determined depending on the three-dimensional coordinates of said measuring points.

2. The preparing method as claimed in claim 1, wherein, in the determining operation, the two-dimensional coordinates of a plurality of elementary points are acquired, which points belong to the surround profile and characterize the two-dimensional geometry of the surround profile, and, in the calculating step, the measuring points chosen are each homologous with one of the elementary points of the surround profile.

3. The preparing method as claimed in claim 1, wherein the two surround traces are homotheties of the surround profile.

4. The preparing method as claimed in claim 1, wherein the two surround traces are constant difference transformations of the surround profile which are such that the gap between each surround trace and the surround profile remains constant.

5. The preparing method as claimed in claim 1, wherein, in the examining step, said optical face of the ophthalmic lens is probed along the two surround traces.

6. The preparing method as claimed in claim 5, wherein, in the examining step, said optical face of the ophthalmic lens is also probed along the surround profile in order to acquire the three-dimensional coordinates of elementary points of this surround profile, and in which said processing instructions are calculated by additionally depending on the three-dimensional coordinates of said elementary points.

7. The preparing method as claimed in claim 1, wherein, in the examining step, the three-dimensional coordinates of three points of the other optical face of the ophthalmic lens are acquired, and the radius of curvature of this other optical face is deduced therefrom, and in which said processing instructions are calculated by additionally depending on this radius of curvature.

8. The preparing method as claimed in claim 1, wherein the processing operation comprises a step of trimming the ophthalmic lens.

9. The preparing method as claimed in claim 1, wherein the processing operation comprises a step of etching or stamping the ophthalmic lens.

\* \* \* \* \*